May 17, 1932.　　　G. PATART　　　1,859,244
METHOD FOR SYNTHESIZING AND SEPARATING HIGHER ALCOHOLS
Filed March 26, 1926
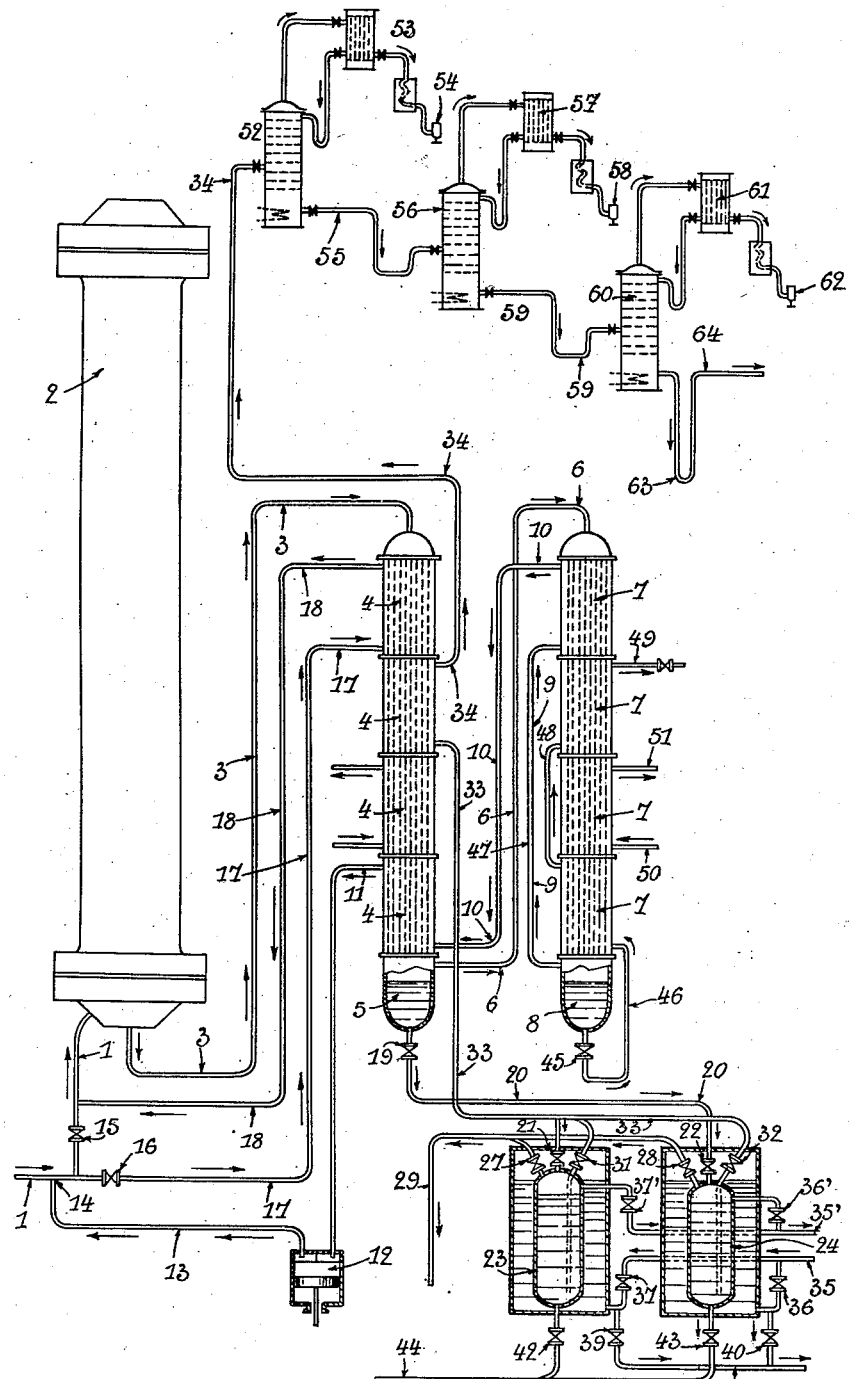
Georges Patart
by his attorneys,
Prindle, Wright, Neal & Bean.

Patented May 17, 1932

1,859,244

UNITED STATES PATENT OFFICE

GEORGES PATART, OF PARIS, FRANCE

METHOD FOR SYNTHESIZING AND SEPARATING HIGHER ALCOHOLS

Application filed March 26, 1926. Serial No. 97,548.

It is a known fact that practically pure methyl alcohol can be obtained by the catalytic reduction of the oxides of carbon at high temperature and pressure, the alcohol forming the principal product of the reaction.

It has also been proposed to incorporate into the catalyzer, substances having a pronounced basic character such as the alkaline hydroxides, in order to obtain, by cooling the reacting mixture under pressure, a condensate comprising an upper layer of an oily nature which contains a large amount of the higher alcohols. During the reaction, water and carbon dioxide are formed in the gaseous mixture. It has further been mentioned that, in like conditions, there may be obtained concurrently with methyl alcohol, certain oily substances which are insoluble or but slightly soluble in water, consisting chiefly of the higher alcohols, provided care is taken to circulate the reacting gas mixture upon the catalyzer with a small output which is not over 3000 liters (measured at atmospheric pressure) per kg. of the catalyzer and per hour, and at temperatures between 400 and 500 degrees C. Like results may be obtained by circulating upon the catalyzer methyl alcohol or its homologues resulting from a former operation.

The object of the present invention is a method whereby the principal and almost exclusive product obtained by the reduction of the oxides of carbon, is a mixture of products, which are insoluble in water, the major part of this mixture consisting of higher alcohols and the corresponding esters and ketones, this mixture containing no hydrocarbons without the formation of methyl alcohol being preponderant and with outputs of the reaction mixture which attain or even exceed 10.000 liters per kg. of the catalyzer and per hour, at a pressure of 200–250 atm., and which will exceed 50.000 liters if the pressure reaches or exceeds 500 atm.

According to the present invention these results can only be obtained by adopting the following measures for the preparation of the catalyzer and for carrying out the operation.

1. The catalyzer consists of one or more metallic oxides which, according to previous researches, are known as methanol forming catalyzers, i. e. metallic oxides by means of which methyl alcohol is the principal product of the reaction, said catalyzers being for instance the oxides of silver, of copper, zinc, manganese, molybdenum, uranium, vanadium or of other metals, with which are very intimately incorporated one or more alkali metal oxides or alkaline earth metal oxides, said oxides being used solely in the form of definite salts and in combination with metallic oxides of an acid nature such as chromates, manganates, molybdates, tungstates or vanadates of sodium, potassium, barium and other metals. The components of the catalyzer are employed, according to my invention, in such proportions that the number of atoms of the alkali metal such as potassium, sodium, rubidium etc., shall be at least equal to one-half the total number of atoms of the metals, properly so called, contained in the said catalyzer. As concerns the alkaline earth metal oxides (calcium, barium and the like) the proportion may be one-half the above.

I may obtain a catalyzing mass fulfilling these conditions by intimately mixing 830 grams of zinc oxide with 2 kgs. of neutral potassium chromate, or by mixing 105 grams of manganese bioxide with 2 kgs. of neutral tungstate of barium.

2. It is quite essential to obtain an intimate mixture of the said components of the catlytic mass by the use of the most energetic and efficient means, in order that the aforesaid results shall be obtained in a reliable and a durable manner and with a large output and a uniform composition of the product of the reaction, which consists chiefly of higher alcohols, and chiefly of propyl, butyl and amyl alcohol, and without formation of methyl alcohol except as a secondary product.

To obtain this intimate mixture, according to this invention, I may mix the components by a long and effective process with 10 to 20 per cent of a 10 per cent solution of dextrine or of gum tragacanth, and I thus obtain a thick paste which is drawn through a suitable apparatus in order to produce a band having 2 to 3 mm. width and 3 to 4 mm. thickness. This is suitably dried, and is then broken up into grains which are as regular as possible, said grains being then dried to the maximum at a temperature not exceeding 320 degrees C., all dust being eliminated before the said material is employed.

I prefer however to grind the said mixture between heavy grinding stones (1500 kgs. as a minimum) for one or two hours, and then to form it into plates or sheets under the hydraulic press, said sheets then being broken up into grains of the same size as above mentioned, by means of the processes employed in the manufacture of gunpowder from saltpeter, sulphur and charcoal, or by analogous processes.

3. The gas mixture will preferably consist of industrial water gas which contains substantially 50 volumes of hydrogen and 40 volumes of carbon monoxide, which composition—as will be further set forth—corresponds almost exactly to the proportion of the gaseous elements entering into the reaction in order to produce the higher alcohols. But any other suitable gas mixture may be employed for the reaction, provided it contains oxygenated or hydrogenated compounds of carbon. The gaseous products, having sulphur or iron as a base, which may be contained in the reacting gas mixture, may be sufficiently purified by the known methods in use in illuminating gas manufacture.

4. For the practical operation of my said process, it is important, if not indispensable, that the same should be carried out in a closed circuit, i. e. the uncombined gases being again circulated under pressure upon the catalytic mass. It is even advantageous to eliminate in a continuous manner the carbon dioxide which is produced during the reaction and which would rapidly attain 15–16 per cent, for this increase would offer prejudice as concerns both the quantity and the uniform composition of the collected products. To eliminate carbon dioxide, I utilize the very high pressure to which the gas mixture is generally subjected in such syntheses in order to liquefy—by proper cooling—the carbon dioxide contained in the gas mixture discharged from the alcohol condenser, whereby the amount of carbon dioxide will be reduced to 2 or 3 per cent at the maximum. This result can be easily obtained by operating at pressures of 500–800 atmospheres and by the use of means which will be further set forth.

By operating as aforesaid, I obtain at 400 degrees C., by the cooling of the gas mixture under pressure, a condensate which consists of an upper insoluble layer (density 0.885–0.890) and a lower aqueous layer (density 0.925–0.940) which latter represents about two-thirds of the total volume. The upper layer is drawn off, and the lower layer is treated with a saturated aqueous solution of sodium chloride, then cooling to about −20 degrees C. An upper layer is again formed which consists of a further amount of insoluble products representing about one-fourth the volume of the original aqueous layer. This upper layer is drawn off and is added to the portion which was previously withdrawn. This product is treated with potassium carbonate, to remove any water which it may contain. It is then distilled and is rectified firstly under normal pressure, and then in vacuo by the known methods, in order to remove the parts containing practically the whole of the series of monatomic alcohols derived from the saturated hydrocarbons, from propyl alcohol to the hexyl and heptyl alcohols, and their higher homologues. The heaviest products have an odour which is like that of wood tar or pitch. The major part—or about three-fifths—consists of propyl, butyl and amyl alcohol. The salt solution with which the aqueous solution was treated contains a small quantity of ethyl and methyl alcohol which are removed by the known distilling processes.

From the composition of the collected liquid substances and of the gaseous mixture after the reaction, it appears that the higher alcohols are produced according to the equation $$(3n-1)\ CO + (3n+1)H_2 = 2C_nH_{2n+2}O + (n-1)CO_2 + (n-1)H_2O.$$

The resulting alcohols will correspond for the most part to values of $n$ between 3 and 7, or 5 on the average, the corresponding mean composition of the gases entering into the reaction should be 48 parts hydrogen to 42 parts carbon monoxide, by volume, this corresponding almost exactly to the mean composition of industrial water gas.

I find it necessary to remove the whole of the water before the rectifying process, to avoid the formation of azeotropic compounds between certain alcohols and water, as such compounds have a low boiling point and would hinder the separation of the different alcohols by rectification.

By means of the installation which will be described hereunder I am enabled to carry out the said process on a manufacturing scale, this being given solely by way of example and without limiting the scope of the invention, the description being given with reference to the appended drawing which shows diagrammatically the said installation.

The gas mixture, which is compressed to the highest possible operating pressure, enters at 1 in order to supply it to the catalyzing apparatus 2, either directly through the cock 15 or indirectly through the cock 16 and the pipe 17, 18, after recovery of heat at 4. After circulating upon the catalytic mass which is maintained at the operating temperature of 400 degrees C., the gases are discharged at 3 and are delivered into the upper part of the set of tubes 4—4—4—4 constituting the condensing apparatus which comprises four sections. During their descent to the lower part of said tubes, the gases are successively cooled, 1°, in the upper section, by the gas which is to be sent back to the catalyzing apparatus and which enters at 17 and issues at 18; 2°, in the second section by the alcohols to be evaporated, which enter at 33 and issue at 34; 3°, in the third section by cold water supplied at 65 and discharged at 66; 4°, in the bottom section by the cold gases from the second condensing apparatus 7, which enter at 10 and issue at 11.

Due to this successive cooling, the alcohols and the water, contained in the gases, will be entirely condensed and will collect at 5. The non-condensable gases, comprising the carbon dioxide formed during the reaction, will issue at 6 and will enter the upper part of the second condensing apparatus having the four sections 7, 7, 7, 7; the gases circulate through these tubes to the bottom, and are successively cooled as follows: 1°, in the upper section by the gases sent back to the first condenser which are supplied at 9 and discharged at 10; 2°, in the second section by the gaseous carbon dioxide discharged from the bottom section, which enters at 48 and issues at 49 at which point a pressure regulating cock is placed; 3°, in the third section, by means of an artifically cooled brine which enters at 50 at a temperature between −20 and −35 degrees C. and which issues at 51; 4°, in the bottom section, by the evaporation of the liquid carbon dioxide which enters at 46 and is discharged in the gaseous state at 49, and whereof the evaporation pressure, and consequently the temperature, is regulated by the cock disposed at 49.

Under the action of this successive and systematic cooling, the carbon dioxide in the gas mixture condensers and collects at 8, at the lower part of the second condenser. The uncondensable gases are discharged at 9, circulate in the upper section of the device 7, issue at 10, enter the lower section of the condenser 4, issue at 11, and are taken up by the circulation pump 12 and are circulated through 13 to the gas inlet piping into which they enter at 14, and are again circulated into the catalyzing apparatus 2.

The mixture of the alcohols and water which collects at the lower part 5 of the apparatus 4, flows out through 19 and 20 and the cocks 21 and 22 and enters one of the two water-removing apparatus 23 or 24 which are put into alternate use and may be externally cooled by a cooling mixture which respectively enters at 35—36 or 35—37 and issues at 37'—35' or at 36'—35'. Since the total amount of the liquid is about one-half the capacity of the recipient in use, the liquid is first allowed to expand at 27 or 28 so as to discharge the dissolved gases through the pipe 29 which leads them to the compressor, and the pressure being thus reduced to one or two atmospheres, this being necessary for the circulation movement of the liquids. The gases which are disengaged may be scrubbed in the brine used to supply the recipients, as will be further mentioned. When the liquid has thus been allowed to expand, I supply at 42 or 43 a suitable amount of a saturated common salt brine, compressed to the proper degree, and then the device for the cooling of the refrigerating liquid is operated. When cooled by the internal brine, the alcoholic liquid separates into two layers, whereof the bottom layer contains only the very soluble alcohols (methyl and ethyl alcohols) which are present in very small quantities. This bottom layer is evacuated according to the indications of the external level gauges, and the operation is performed a second time. The insoluble alcohols remaining in the apparatus are then circulated through 33 into the second section of the condenser 4, in which they will be heated and will be wholly or partially volatilized, and will proceed thence through 34, after a total dehydration upon potassium carbonate, into the first column 52 of the rectifying plant. The brine discharged at 43—44 or 42—44 is separately distilled to remove the soluble alcohols contained therein, and said brine may be again employed, after concentration.

As concerns the carbon dioxide which is liquefied at 8, this is discharged at 45—46 and sent into the lower section of the condenser 7 in which it is volatilized, issuing thence at 19; it is heated in the second section of the condenser 7 into which it enters at 48, issuing at 49, at which point its expansion is regulated by a suitable cock.

The different alcohols are separated in the columns 52, 56, 60 and the like which form part of the rectifying plant. The pure alcohols are collected in the recipients 54, 58, 62 and the like, and the last-distilled products are collected at 64. The rectifying operation may be completed in vacuo.

The alcohols which are thus produced will afford the following products which can be obtained therefrom by methods known per se.

I obtain in the first place, by dehydration, the corresponding series of ethylenic hydrocarbons and the latter may be transformed by catalytic hydrogenation under pressure into saturated hydrocarbons; secondly, the alcohols themselves, by catalytic dehydrogenation, can be made to produce the corresponding aldehydes (as concerns the primary alcohols) and ketones (as concerns the secondary alcohols). I may further employ oxidation in order to obtain the corresponding acids. The process according to the invention thus comprises a series of simple and inexpensive means whereby I am enabled to obtain various products in almost unlimited quantities and without expenditure for accessory reagents, solely by the use, as raw material, of the gases which are most commonly produced from coal as the sole raw material. The said products which I obtain consist of a continuous and very complete series of hydrocarbons, alcohols, aldehydes, ketones and acids whereof the major part have as yet been obtained only by indirect methods or as the by-products from other industries, and in insufficient quantities and at prices which were almost prohibitive as concerns their use in the industries of organic chemistry. The products which are not employed in these industries will constitute excellent liquid fuels which may compete with oils derived from coal or petroleum.

Having now described my invention, what I claim as new and desire to secure by Letters Patent is:

1. The method of synthesizing methyl alcohol and higher alcohols which consists in subjecting a mixture of carbon oxides and hydrogen at a high pressure and at a temperature of at least 300° C. to the action of a mixed catalyzer formed of a very intimate mixture of alkali metal salts of metal oxides of an acid nature with methanol-forming metal oxides catalysts, cooling while maintaining the pressure the gases produced by said catalytic action so as to condense the carbon dioxide and the methane contained in said gases and subjecting the remaining gases again to the action of the said catalyzer.

2. In the process of forming a mixture of aliphatic alcohols including methyl, ethyl, propyl, butyl, and amyl alcohols in which the proportion of higher alcohols predominates, from a mixture of hydrogen and carbon monoxide, the step which comprises passing the gas mixture, at a temperature of at least 300° C. and a pressure of 250–800 atmospheres, over a mixed catalyst prepared by intimately mixing a methanol-forming metal oxide catalyst with an alkali metal chromate in such proportion that the ratio of atoms of alkali metal to atoms of chromium in the catalyst is greater than 1.

3. The process of claim 2 in which the catalyst comprises an unfused mixture of zinc oxide and alkali metal chromate.

4. The process of claim 2 in which the catalyst is an un unfused mixture of zinc oxide and potassium chromate.

5. The process of forming a mixture of aliphatic alcohols including methyl, ethyl, propyl, butyl, and amyl alcohols in which the proportion of higher alcohols predominates, from a mixture of hydrogen and carbon oxides, which comprises passing the gas mixture, at a temperature of at least 300° C. and a pressure of 250–800 atmospheres, over a catalyst consisting of an unfused, intimate mixture of zinc oxide and potassium chromate in which the percentage of zinc oxide is at least 30%, cooling the resulting vapor mixture while maintaining the pressure to condense and remove alcohol and water formed in the reaction, thereafter cooling the residual gas under pressure to condense and remove carbon dioxide from uncondensable gases, and recirculating the uncondensable gases through the catalyst.

6. The method of synthesizing methyl alcohol and higher alcohols which consists in subjecting a mixture of carbon oxides and hydrogen to a pressure of at least 200 atmospheres and to a temperature of at least 300° C. in the presence of a mixed catalyst comprising a methanol-forming metal oxide catalyst and a salt taken from the group consisting of alkali and alkaline earth metal salts of acidic metal oxides.

7. The method of synthesizing methyl alcohol and higher alcohols which consists in subjecting a mixture of carbon oxides and hydrogen at a pressure of at least 200 atmospheres and at a temperature of at least 300° C. to the action of a mixed catalyzer formed of a very intimate mixture of alkali metal salts of metal oxides of an acid nature with methanol-forming metal oxide catalysts, the number of atoms of the alkali metal contained in said salts being at least equal to one-half the total number of atoms of the metals properly so called.

8. The method of synthesizing methyl alcohol and higher alcohols which consists in subjecting a mixture of carbon oxides and hydrogen at a pressure of at least 200 atmospheres and at a temperature of at least 300° C. to the action of a mixed catalyzer formed of a very intimate mixture of alkaline earth metal salts of metal oxides of an acid nature with methanol-forming metal oxides catalysts, the number of atoms of the alkaline earth metal contained in said salts being at least equal to one quarter of the total number of atoms of the metals properly so called.

9. The method of synthesizing methyl alcohol and higher alcohols which consists in subjecting a mixture of carbon oxides and hydrogen at a pressure of at least 200 atmospheres and at a temperature of at least 300° C. to the action of a catalyzer formed of a very intimate mixture of zinc oxide and neutral potassium chromate substantially in the following proportions by weight: zinc oxide, 30%; neutral potassium chromate, 70%.

In testimony whereof I have signed my name to this specification.

GEORGES PATART.